(12) United States Patent
Hiraoka

(10) Patent No.: US 6,284,170 B1
(45) Date of Patent: Sep. 4, 2001

(54) METHOD FOR CONTROLLING DRIVE OF SCREW IN INJECTION MOLDING MACHINE

(75) Inventor: Kazuo Hiraoka, Chiba (JP)

(73) Assignee: Sumitomo Heavy Industries Ltd., Tokyo (JP)

( * ) Notice: Subject to any disclaimer, the term of this patent is extended or adjusted under 35 U.S.C. 154(b) by 0 days.

(21) Appl. No.: 09/333,684

(22) Filed: Jun. 16, 1999

(30) Foreign Application Priority Data

Jun. 17, 1998 (JP) .................................................. 10-170176
Jun. 19, 1998 (JP) .................................................. 10-172941

(51) Int. Cl.$^7$ .................................................. B29C 45/77
(52) U.S. Cl. .................................. 264/40.1; 264/328.17; 264/349; 366/78
(58) Field of Search .................................. 264/40.1, 40.4, 264/40.5, 40.7, 328.1, 328.17, 349; 366/78; 425/145

(56) References Cited

U.S. PATENT DOCUMENTS

| | | | |
|---|---|---|---|
| 3,797,808 | * | 3/1974 | Ma et al. . |
| 3,921,963 | * | 11/1975 | Neff et al. ............................ 264/40.4 |
| 4,579,515 | * | 4/1986 | Kawaguchi et al. .................. 425/145 |
| 4,718,841 | * | 1/1988 | Kiya .................................... 264/40.5 |
| 4,755,123 | * | 7/1988 | Otake .................................. 264/40.7 |
| 5,232,714 | * | 8/1993 | Kohno et al. ........................ 264/40.4 |
| 5,879,597 | * | 3/1999 | Urbanek .............................. 264/40.1 |

FOREIGN PATENT DOCUMENTS

| | | |
|---|---|---|
| 61-58713 | 3/1986 | (JP) . |
| 62-119020 | 5/1987 | (JP) . |
| 1-290408 | 11/1989 | (JP) . |
| 2-121818 | 5/1990 | (JP) . |
| 2-121819 | 5/1990 | (JP) . |
| 4-22613 | 1/1992 | (JP) . |
| 6-270213 | 9/1994 | (JP) . |
| 9-174626 | 7/1997 | (JP) . |

* cited by examiner

*Primary Examiner*—Jill L. Heitbrink
(74) *Attorney, Agent, or Firm*—Arent Fox Kintner Plotkin & Kahn PLLC

(57) ABSTRACT

The present invention is applicable to an injection molding machine comprising an injection device having a servo motor for use in rotating a screw and a controller for controlling the servo motor. The controller has a rotation speed N previously set therein as a set value for the screw rotation in a metering process. The controller rotates the screw at an acceleration A1 until the rotation speed of the screw reaches a value $N_K$ (where $N_K<N$). After that the controller carries out a control operation to rotate the screw at an acceleration A2 until the rotation speed of the screw reaches the value N. The acceleration A2 is higher than the acceleration A1.

13 Claims, 4 Drawing Sheets

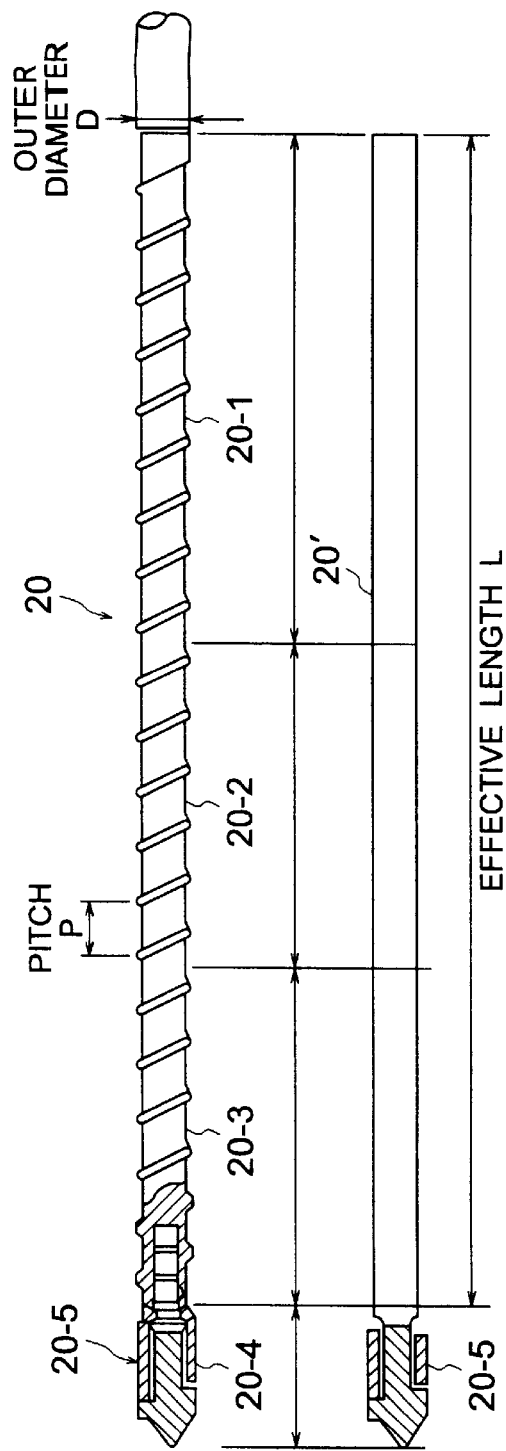

METHOD FOR CONTROLLING DRIVE OF SCREW IN INJECTION MOLDING MACHINE

BACKGROUND OF THE INVENTION

1. Field of the Invention

The present invention relates to an injection molding machine and, more particularly, to an improvement of a method for controlling drive of a screw in a metering or dispensing process.

2. Description of the Related Art

Motor-driven molding machines have increasingly been used in recent years in which a servo motor is used as a substitute for a hydraulic actuator. Operations of such injection device using a servo motor are summarized below.

A screw is rotated with a servo motor for screw rotation in a plasticization/metering process. The screw is located within a heating cylinder. A resin is fed from a hopper to a rear portion of the screw in the heating cylinder. Rotation of the screw melts and advances the resin and thus a certain metered amount of resin is fed to a nose portion of the heating cylinder. During this time, the screw is driven backward due to a back pressure of the molten resin trapped in the nose portion of the heating cylinder.

An injection shaft is directly connected to the rear end portion of the screw. The injection shaft is rotatably supported by a pressure plate through a bearing. The injection shaft is driven in the axial direction with a servo motor for injection that is supported on the pressure plate. The pressure plate moves forward and backward along guide bars in response to the operation of the servo motor for injection through a ball screw. The above-mentioned back pressure of the molten resin is detected by using a load cell and is controlled with a control loop, as will be described more in detail below.

Then, in a filling process, the pressure plate is advanced by means of driving the servo motor for injection. A nose portion of the screw serves as a piston to fill a mold with the molten resin.

The molten resin fills the space within the cavity at the end of the filling process. At this point, the control mode for the advancing motion of the screw is switched from a velocity control mode to a pressure control mode. This switching is referred to as a "V (Velocity)-P (Pressure) switching".

Following the V-P switching, the resin within the cavity of the mold is allowed to cool under a predetermined pressure. This process is referred to as a dwelling process. In this dwelling process, the pressure of the resin is controlled in a feedback control loop as in the above-mentioned back pressure control.

Then, the injection device returns to the plasticization/metering process after the completion of the dwelling process. On the other hand, in a clamping device, an eject operation is carried out for ejecting a solid product out of the mold in parallel with the plasticization/metering process. The eject operation involves in opening the mold to remove the solid product from the mold by means of an ejector mechanism and then closing the mold for the resin filling.

As will be described more in detail below, a rotation speed of the screw in the metering process is determined such that the screw rotates at the highest speed at the beginning of the metering, which is decreased stepwise during the course of the metering. In particular, it is necessary to use a linear or quadric function to slow down an initial (start-up) rotation of the screw at the beginning of the metering process until the rotation speed reaches a predetermined value N. To this end, the start-up operation should be slowed down until the speed reaches the predetermined value N. This prolongs the time duration before reaching the predetermined value N and, in turn, prolongs one molding cycle.

In addition, the rotation speed of the screw during the metering process is required to be determined stepwise depending on a stroke, that is, a position of the screw while considering a resident time of the resin. Having such several values for the rotation speed is troublesome and bothering because it should be done when it becomes necessary to change a diameter of the screw.

SUMMARY OF THE INVENTION

Therefore, an object of the present invention is to provide a method for controlling drive of a screw that slows down the initial rotation of the screw at the beginning of the metering process without prolonging the time period required before reaching the predetermined value N.

It is another object of the present invention is to provide a method for controlling drive of a screw in which rotation speed of the screw can be set easily during the metering process.

The present invention is applicable to an injection molding machine comprising an injection device having a driving unit for use in rotating a screw and a controller for controlling the driving unit.

According to a first aspect of the present invention, a rotation speed N is previously set in the controller as a set value at which the screw is rotated in a metering process. The controller rotates the screw at a slow acceleration A1 until the rotation speed of the screw reaches a value $N_K$ (where $N_K<N$).

After that the controller carries out a control operation to rotate the screw at an acceleration A2 until the rotation speed of the screw reaches the value N, the acceleration A2 being higher than the acceleration A1. The rotation speed $N_K$ is defined at a predetermined certain ratio K relative to the rotation speed N.

In addition, the present invention is also applicable to an injection molding machine comprising an injection device having a first driving unit for use in rotating a screw; a second driving unit for use in moving the screw in the axial direction via an injection shaft; a position detector for detecting a position of the screw; and a controller for controlling the first driving unit in accordance with a value indicative of the detected position supplied from the position detector.

According to a second aspect of the present invention, rotation speeds Ns and Ne are predetermined as set values at which the screw is rotated at the beginning and end, respectively, of a metering process. The controller carries out an operation to interpolate and control the rotation speed of the screw throughout the metering process from the beginning to the end depending on the rotation speeds Ns and Ne and the value indicative of the detected position supplied from the position detector.

BRIEF DESCRIPTION OF THE DRAWINGS

For a more complete understanding of the present invention, reference should be made to the appended drawings, wherein:

FIGS. 2A and 2B are explanatory views illustrating a configuration of a screw in FIG. 1;

DESCRIPTION OF THE PREFERRED EMBODIMENT

Figure 1:
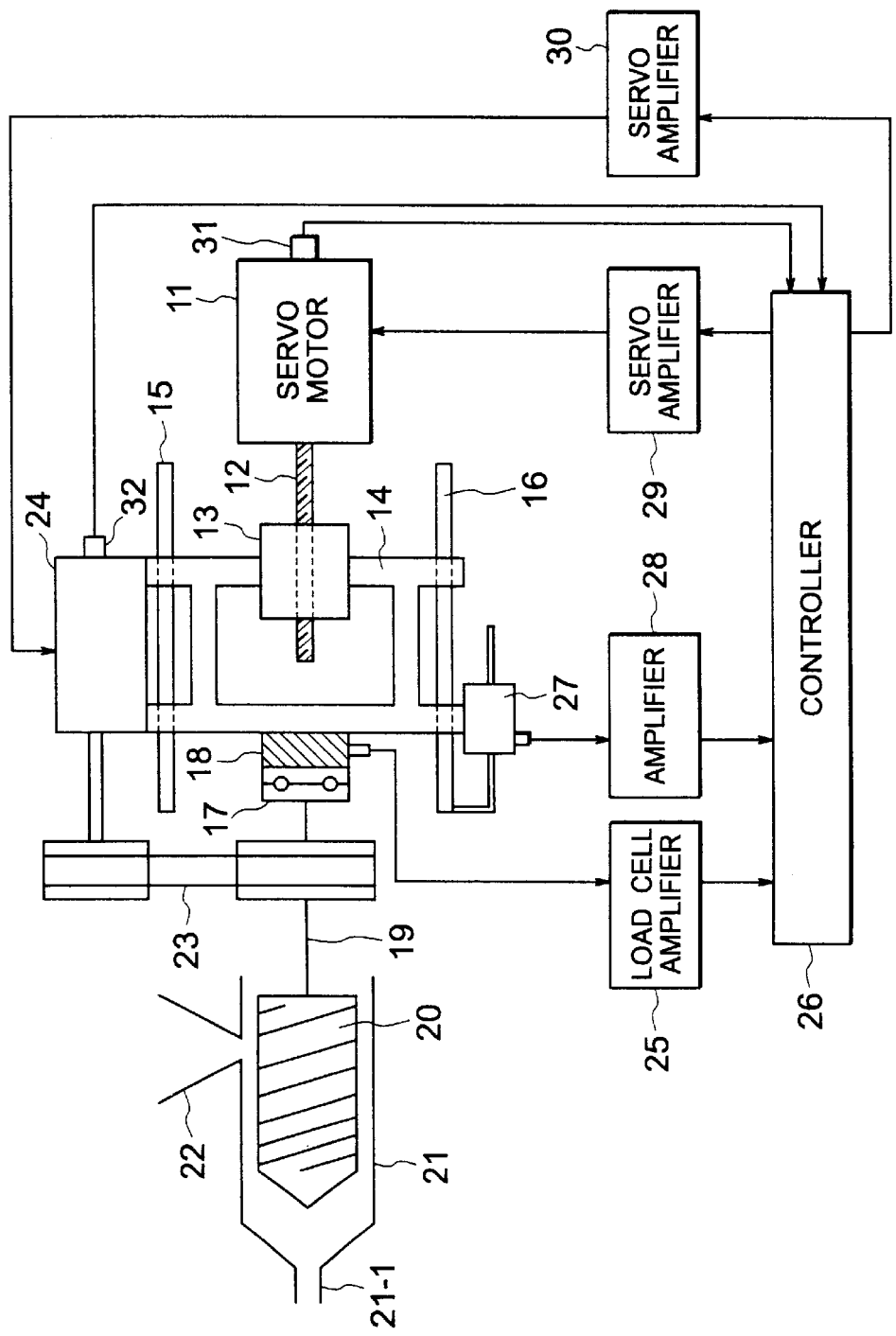
FIG. 1 is a schematic view of a motor-driven molding machine which comprises an injection device driven with a servo motor.

Referring to FIG. 1, a configuration of a motor-driven injection molding machine is described that comprises an injection device operated by servo motors, for the purpose of facilitating the understanding of the present invention. The injection device rotates a screw by means of transmitting a rotation motion of the servo motor into a linear motion through a ball screw and a nut.

In FIG. 1, rotation of an injection servo motor 11 is transmitted to a ball screw 12. A nut 13 is fixed to a pressure plate 14 such that it advances and is retracted in response to the rotation of the ball screw 12. The pressure plate 14 is movable along guide bars 15 and 16 fixed to a base frame (not shown). The back and forth movement of the pressure plate 14 is transmitted to a screw 20 via a bearing 17, a load cell 18, and an injection shaft 19. The screw 20 is positioned within a heating cylinder 21 such that it is rotatable and movable in the axial direction. The heating cylinder 21 corresponding to the rear portion of the screw 20 is provided with a hopper 22 for feeding a resin. The rotation motion of a screw-rotation servo motor 24 is transmitted to the injection shaft 19 via a coupling member 23 comprised of, for example, a belt and a pulley. In other words, the screw 20 rotates as a result that the injection shaft 19 is rotation driven by the screw-rotation servo motor 24.

In a plasticization/metering process, a molten resin is stored in the heating cylinder 21 at the head of the screw 20, that is, on the side of a nozzle 21-1 when the screw 20 goes backward while rotating in the heating cylinder 21. The molten resin in front of the screw 20 is then filled in a mold and pressurized for molding by advancing the screw 20 in the heating cylinder 21. A force acting upon the resin is detected by the load cell 18 as a reaction force, namely, a pressure. The detected pressure is amplified by a load cell amplifier 25 and is then supplied to a controller 26.

A position detector 27 is attached to the pressure plate 14 for detecting an amount of movement of the screw 20. A detection signal from the position detector 27 is amplified by an amplifier 28 and is then supplied to the controller 26. The controller 26 supplies a current (torque) command to servo amplifiers 29 and 30 depending on the above-mentioned processes for each of the values set by an operator. The servo amplifier 29 controls an output torque of the servo motor 11 by means of controlling a driving current for the servo motor 11. The servo amplifier 30 controls a rotation speed of the screw-rotation servo motor 24 by means of controlling a driving current for the screw-rotation servo motor 24. The injection servo motor 11 and the screw-rotation servo motor 24 are provided with encoders 31 and 32, respectively, for detecting a rotation speed. The rotation speed detected by the encoders 31 and 32 are supplied to the controller 26. In particular, the rotation speed detected by the encoder 32 is used for determining a rotation speed of the screw 20.

It is noted that the configuration illustrated in FIG. 1 is for the sake of simplicity and convenience. A specific configuration of the injection device is described in, for example, Japanese Patent Laid-Open No. 9-174626.

Referring to FIGS. 2A and 2B, the screw 20 is described in detail. In FIG. 2A, the screw 20 is formed of four sections: a feed section 20-1, a compression section 20-2, a metering section 20-3, and a head section 204. The feed section 20-1 is for feeding the resin from the hopper 22 (FIG. 1) ahead a solid state or a partially molten state. A temperature of the resin is increased to around a molten point at the feed section 20-1. Considering this, the feed section 20-1 typically has a rod-shaped member 20' (FIG. 2B) of a generally constant diameter along the length thereof and has a helical groove in the peripheral surface thereof.

The resin particles supplied from the feed section 20-1 to the compression section 20-2 are spaced away from each other. Therefore, a molten resin in the compression section 20-2 has an approximately half the volume of the resin before melting. The compression section 20-2 is for reducing the space through which the resin is allowed to pass, in order to make up for the reduced volume. This can be achieved by means of tapering the rod-shaped member 20 at the position corresponding to the compression section 20-2 to make the helical groove shallow. The compression section 20-2 compresses the molten resin, enhances an exothermic effect caused by friction, and increases the pressure of the resin to push back the air in the heating cylinder 21, the moisture and a volatile gas or gases contained in the air and contaminated in the resin to the hopper 22. As apparent from the above, the resin pressure in the heating cylinder 21 is at the highest level in the compression section 20-2.

The rod-shaped member 20' has the largest diameter in the region corresponding to the metering section 20-3. The metering section 20-3 has the shallowest helical groove formed in the rod-shaped member 20'. The resin is subjected to a large shearing force in the metering section 20-3 and heated to a uniform temperature with an internal exothermic reaction. A certain amount of resin is then fed towards the nozzle side in the heating cylinder 21.

The feeding of the molten resin from the metering section 20-3 to the nozzle side is performed through a check-valve ring 20-5 in the head section 20-4. The check-valve ring 20-5 is located at a position closer to the left side in the figure during the metering process. In this state, the molten resin can be fed to the metering section 20-3 to the nozzle side.

After the completion of the metering process, the check-valve ring 20-5 moves to the right side in the figure because of a pressure difference. As a result, the resin is prevented from flowing back away from the nozzle side to the metering section 20-3. The head section 204 is typically formed separately from the rod-shaped member 20'. The head section 20-4 has a male thread formed in the root portion thereof. The rod-shaped member 20' has a female thread formed in an end thereof. The head section 20-4 is coupled to the rod-shaped member 20' by means of engaging the male thread formed in the head section 20-4 with the female thread in the rod-shaped member 20'. To this end, the root portion of the head section 20-4 is significantly smaller in diameter than the rod-shaped member 20'.

Figure 3A:
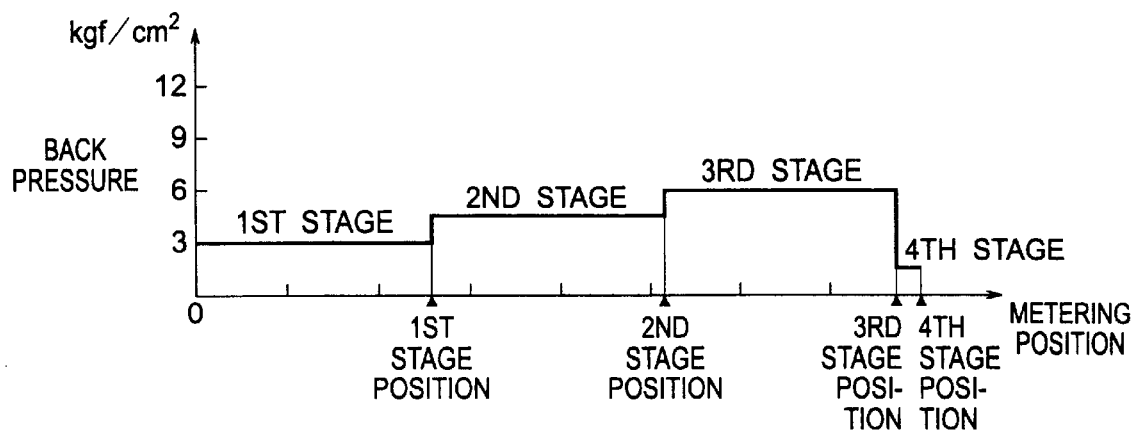
FIGS. 3A and 3B are graphical representations illustrating a back pressure of a screw and a rotation speed of a screw at which the screw is rotated in a metering process in a conventional motor-driven molding machine.
Figure 3B:
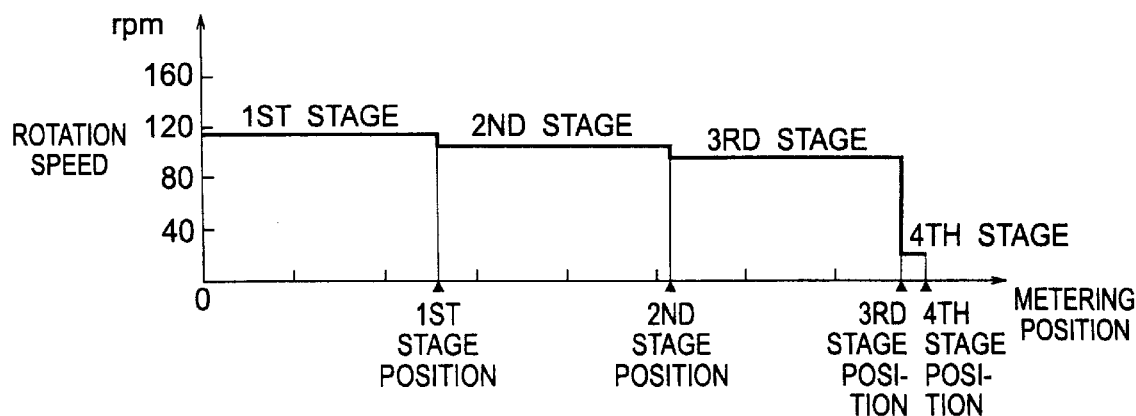

Referring now to FIGS. 3A and 3B, how to determine the rotation speed of the screw in the metering process is described. FIG. 3A shows a metering position, that is, a screw position in relation to a back pressure of the screw. On the other hand, FIG. 3B shows the metering position in relation to a rotation speed of the screw. Both FIGS. 3A and 3B are for an example of a four-stage setting operation.

Among the four stages of the setting, the former three stages are generally used to equalize the temperature of the resin. In these three stages, the resin at a high temperature is metered in combination with a relatively high screw rotation speed and a low back pressure in the former half of the heating cylinder 21. During the course of the metering, the residence time for the resin is increased. The rotation speed is decreased in a stepwise manner in order to increase the exothermic amount due to the shearing of the resin while the back pressure is increased. The fourth, final stage is for providing a setting to improve the accuracy of the metered value used at the beginning of the filling process. More specifically, a very low rotation speed and a very low back pressure value are set in order to avoid overrun of the screw at the position two or three millimeters short of the completion point of the metering, and also avoid back flow of the resin.

As apparent from the above, the rotation speed of the screw 20 in the metering process is the highest at the beginning of the metering, and is decreased stepwise thereafter. Thus, the head section 20-4 of the screw 20 receives a large load at the beginning of the rotation of the screw 20. Such a large load may damage the threaded portion of the head section 20-4.

The check-valve ring 20-5 is almost in contact with the inner wall of the heating cylinder 21. Because of this, the screw 20 does not move at the beginning of the rotation of the screw 20 upon the initiation of the metering. This means that the rotation of the screw 20 causes a local heating due to the friction between the check-valve ring 20-5 and the inner wall of the heating cylinder 21 to generate a heat. The heat may adversely affect the resin. With respect to this, a linear or quadric function is used to slow down an initial (start-up) rotation of the screw at the beginning of the metering process for a predetermined value N of the rotation speed at the beginning of the metering. However, this requires the start-up operation to be slowed down until the speed reaches the predetermined value N. It prolongs the time duration before reaching the predetermined value N and, in turn, prolongs one molding cycle. Furthermore, the rotation speed of the screw 20 during the metering process is required to be determined stepwise depending on a stroke, that is, a position of the screw 20 while considering a resident time of the resin. Having such several values for the rotation speed is troublesome and bothering because it should be done when it becomes necessary to change a diameter of the screw 20.

Figure 4:
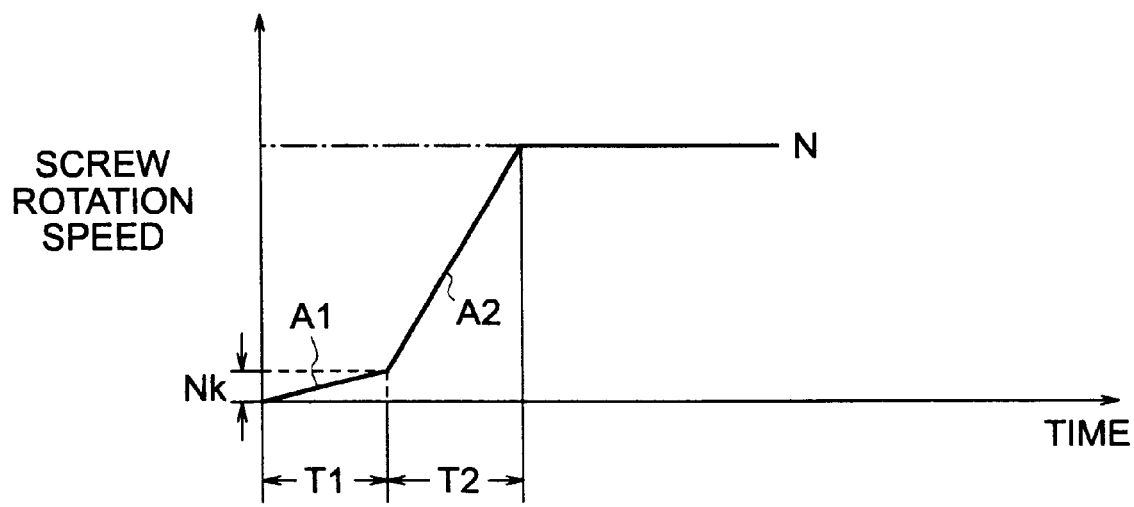
FIG. 4 is a graphical representation of a rotation speed of a screw at which the screw is rotated in a metering process, which is for use in describing how to control drive of the screw according to a first embodiment of the present invention.

Referring to FIG. 4, a method for controlling drive of a screw according to a first embodiment of the present invention is described. This method can be applied to a motor-driven injection device driven with a servo motor as described in conjunction with FIG. 1. However, with the method for controlling the drive of the screw according to this embodiment being applied to the injection device illustrated in FIG. 1, control operations achieved by the controller 26 are different from those obtained in the conventional injection device. The following description is made with reference to FIGS. 1, 2A and 2B as well as FIG. 4.

To perform the method for controlling the drive of the screw according to this embodiment, an operator must set a value (rotation speed) N in the controller 26 for the rotation speed of the screw 20 at the beginning of the metering. The controller 26 carries out a control operation to rotate the screw 20 at a slow acceleration A1 until the rotation speed of the screw 20 reaches a value (rotation speed) $N_K$. The rotation speed $N_K$ is defined at a predetermined certain ratio K relative to the rotation speed N. Following the rotation speed of the screw reaches the rotation speed $N_K$, the controller 26 carries out a control operation to rotate the screw at an acceleration A2 until the rotation speed of the screw 20 reaches the rotation speed N. The acceleration A2 has a value larger than that of the acceleration A1. In addition, the ratio K is determined such that the rotation speed $N_K$ depending on it does not cause a sudden load to be applied to the head section 204 of the screw 20 that may result in a damage.

In particular, the controller 26 in this embodiment calculates a time interval T1 from the beginning of the metering process to the time when the rotation speed reaches the rotation speed $N_K$, by using the predetermined value N of the rotation speed. The controller 26 controls the screw-rotation servo motor 24 to ensure that the screw 20 rotates at the acceleration of A1 during the calculated time interval T1. Then, the controller 26 calculates a time interval T2 between the point when the rotation speed $N_K$ is achieved to the point when the rotation speed reaches the rotation speed N. Upon reaching the value $N_K$ of the rotation speed of the screw 20, the controller 26 shifts to control of the screw-rotation servo motor 24 to ensure that the screw 20 at the acceleration of A2 during the calculated time interval T2.

The start-up of the screw rotation is made gradually and no significant load is thus applied to the head section 20-4. This is similar to a situation where a cushioning effect is obtained during the start-up operation. The screw starts up at the acceleration A2, during the time interval between the rotation speed $N_K$ to the rotation speed N, that is significantly larger than the acceleration A1. Therefore, the time duration required to reach the rotation speed N is not so much prolonged. Furthermore, the movement of the screw begins before the start-up at the acceleration A2. No local heating is thus generated which otherwise may occur due to the friction between the check-valve ring 20-5 and the inner wall of the heating cylinder 21. This means that any adverse effect on the resin due to the local heating can be avoided.

As described above, according to the present embodiment, the start-up of the screw at the beginning of the metering process is provided in the manner with the automatic cushioning effect by means of simply setting the predetermined value N of the rotation speed at which the screw is rotated at the beginning of the metering process, while avoiding any damage of the head section and the adverse local heating.

Figure 5:
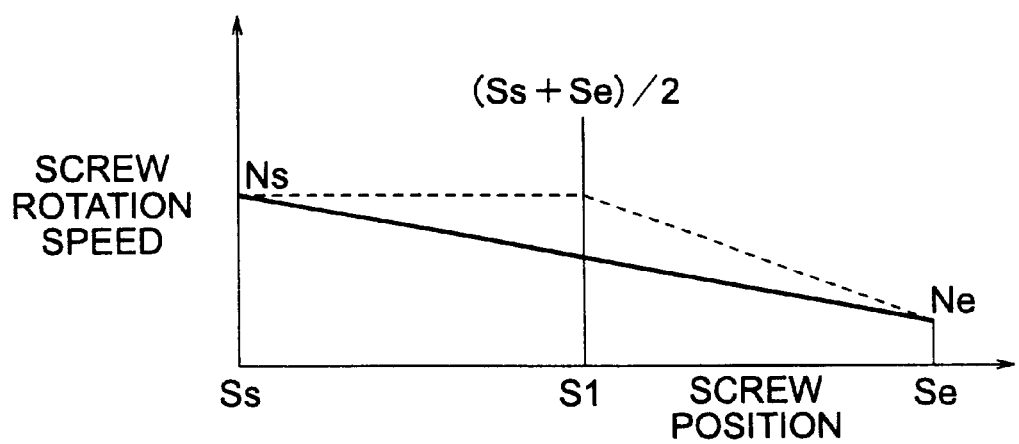
FIG. 5 is a graphical representation of a rotation speed of a screw at which the screw is rotated in the metering process, which is for use in describing how to control drive of the screw according to a second embodiment of the present invention.

Referring to FIG. 5, a method for controlling the drive of the screw according to a second embodiment of the present invention is described. This method can also be applied to a motor-driven injection device driven with a servo motor as described in conjunction with FIG. 1. However, with the method for controlling the drive of the screw according to this embodiment being applied to the injection device illustrated in FIG. 1, control operations achieved by the controller 26 are different from those obtained in the conventional injection device. The following description is made with reference to FIGS. 1, 2A and 2B as well as FIG. 5.

For providing the method for controlling the drive of the screw according to this embodiment, the only thing which an operator is required to do is to set values Ns and Ne in the controller 26 for the rotation speed of the screw at the beginning and end, respectively, of the metering process. The controller 26 interpolates the rotation speed of the screw 20 from the beginning to the end of the metering process, by using the predetermined values Ns and Ne for the rotation speed as well as a position detection value supplied from the position detector 27. The controller 26 controls the screw-rotation servo motor 24 in accordance with the interpolated value. More specifically, the controller 26 uses a linear interpolation as shown in a solid line in FIG. 5 for the rotation speed of the screw 20 from the beginning to the end of the metering process in accordance with the position detection value, that is, the current screw position, based on the values Ns and Ne of the predetermined rotation speed and screw positions Ss and Se at the beginning and end, respectively, of the metering process. The screw position Ss at the beginning of the metering process corresponds to the position of the screw when the rotation speed of the screw 20 reaches the value Ns.

Let the current screw position be X for the case illustrated in FIG. 5, an interpolated rotation speed Y of the screw is given as follows:

$$Y=Ne+\{(Ns-Ne)/(Se-Ss)\}\times(Se-X).$$

The controller 26 may use the value Ns as the rotation speed of the screw until the screw reaches a position S1 between the screw position Ss at the beginning of the metering and the screw position Se at the end of the metering and thereafter, upon the screw reaches the position S1, the controller may carry out a control operation with the interpolation, as depicted by a dotted line in FIG. 5. The position S1 is given by (Ss+Se)/2, which is half the course in FIG. 5. In this case, the controller 26 also uses a linear interpolation for the rotation speed of the screw with the current screw position X in accordance with the values Ns and Ne as well as the mid position (Ss+Se)/2 and the screw position Se, as in the interpolation described above. The position where the rotation speed Ns reaches is not limited to the mid position. It may be any other position obtained according to a predetermined ratio.

In this embodiment, it is just necessary to determine and set the two values for the rotation speed of the screw at the beginning and end of the metering process in the manner described above. This facilitates the operation required for setting the value(s) and changing the set value, if necessary.

While the above mentioned embodiments have been described in conjunction with the motor-driven injection molding machine, the present invention may be applied to hydraulic-driven injection molding machines.

Numerous modifications may be apparent to one of skill in the art, while remaining within the spirit and scope of the invention. To determine the scope of the invention, reference should be made to the appended claims.

What is claimed is:

1. A method for controlling drive of a screw in an injection molding machine, said method comprising the steps of:
   providing an injection device having a driving source for rotating the screw and a controller for controlling the driving source, wherein the controller has a rotation speed N which is previously set therein as a set value at which the screw is rotated in a metering process; said method further comprising the steps of
   first rotating the screw at a first acceleration A1 until the rotation speed of the screw reaches a value $N_K$, where $N_K<N$;
   second rotating the screw at a second acceleration A2 until the rotation speed of the screw reaches the rotation speed N, second acceleration A2 being higher than first acceleration A1, the value $N_K$ being defined at a predetermined certain ratio K relative to said rotation speed N.

2. A method as recited in claim 1, wherein said first and second rotating steps comprise controlling the driving source with the controller.

3. A method as claimed in claim 1, further comprising the step of detecting a rotation speed of a servo motor of the driving source, thereby detecting a rotation speed of the screw.

4. A method as claimed in claim 3, further comprising a step of calculating a time interval T1 by using said rotation speed N, said time interval T1 being calculated from the beginning of the metering process to the point where value $N_K$ is reached, and carries out a control operation to rotate the screw at first acceleration A1 during the calculated time interval T1.

5. A method for controlling drive of a screw in an injection molding machine, said method comprising the steps of:
   providing an injection device having a first driving source for use in rotating the screw; a second driving source for use in moving the screw in the axial direction via an injection shaft; a position detector for detecting a position of the screw; and a controller for controlling said first driving source in accordance with a value indicative of the detected position supplied from the position detector;
   providing rotation speeds Ns and Ne which are previously set in the controller as set values at which said screw is rotated at the beginning and end, respectively, of a metering process;
   interpolating the rotation speed of the screw throughout the metering process from the beginning to the end based on the rotation speeds Ns and Ne and the value indicative of the detected position supplied from said position detector; and
   controlling the rotation speed of the screw throughout the metering process from the beginning to the end based on the rotation speeds Ns and Ne and the value indicative of the detected position supplied from said position detector.

6. A method as recited in claim 5, wherein the step of controlling the rotation speed of the screw comprises controlling a rotation speed of a servo motor forming the first driving source.

7. A method as claimed in claim 5, wherein said interpolating step comprises interpolating the rotation speed of the screw from the beginning to the end of the metering process in accordance with the position detection value, using the rotation speeds Ns and Ne and screw positions Ss and Se at the beginning and end, respectively, of said metering process.

8. A method as claimed in claim 7, wherein the screw position Ss at the beginning of the metering process corresponds to the position of the screw when the rotation speed of the screw reaches the rotation speed Ns.

9. A method as claimed in claim 6, further comprising a step of determining a position S1 between the screw position Ss at a beginning of the metering process and the screw position Se at an end of the metering process, the position S1 being determined between the screw positions Ss and Se according to a predetermined ratio, and wherein the controller controls said rotation speed to be Ns until the screw reaches the position S1 from the screw position Ss, and when the screw reaches said position S1, the controller performs the interpolation.

10. A method as recited in claim 5, wherein said controlling step controls the rotation speed according to a linear control function.

11. A method as recited in claim 5, wherein said controlling step controls the rotation speed in a continuously variable manner.

12. A method as recited in claim 5, wherein said controlling step controls the rotation speed from the beginning to the end of the metering process according to a linear control function.

13. A method as recited in claim 5, wherein said controlling step controls the rotation speed from the beginning to the end of the metering process in a continuously variable manner.

* * * * *